US012004566B2

(12) United States Patent
Korus et al.

(10) Patent No.: US 12,004,566 B2
(45) Date of Patent: Jun. 11, 2024

(54) APPARATUS FOR AN AEROSOL GENERATING DEVICE

(71) Applicant: Nicoventures Trading Limited, London (GB)

(72) Inventors: Anton Korus, London (GB); Patrick Moloney, London (GB)

(73) Assignee: NICOVENTURES TRADING LIMITED, London (GB)

( * ) Notice: Subject to any disclaimer, the term of this patent is extended or adjusted under 35 U.S.C. 154(b) by 632 days.

(21) Appl. No.: 17/250,740

(22) PCT Filed: Aug. 30, 2019

(86) PCT No.: PCT/EP2019/073260
§ 371 (c)(1),
(2) Date: Feb. 26, 2021

(87) PCT Pub. No.: WO2020/043901
PCT Pub. Date: Mar. 5, 2020

(65) Prior Publication Data

US 2021/0186108 A1 Jun. 24, 2021

(30) Foreign Application Priority Data

Aug. 31, 2018 (GB) ...................................... 1814198

(51) Int. Cl.
*A24F 40/46* (2020.01)
*A24F 40/465* (2020.01)
(Continued)

(52) U.S. Cl.
CPC ............. *A24F 40/465* (2020.01); *H05B 6/06* (2013.01); *H05B 6/108* (2013.01); *A24F 40/53* (2020.01)

(58) Field of Classification Search
CPC ......... A24F 40/465; A24F 40/53; H05B 6/06; H05B 6/108
(Continued)

(56) References Cited

U.S. PATENT DOCUMENTS 4,016,391 A * 4/1977 Kiuchi .................... H02M 1/06 363/54
4,025,912 A * 5/1977 Rice ...................... G01L 19/086 340/870.18
(Continued)

FOREIGN PATENT DOCUMENTS

EP 3145340 B1 7/2018
WO WO2013060781 A1 5/2013
(Continued)

OTHER PUBLICATIONS

International Search Report and Written Opinion, International Application No. PCT/EP2019/073260, dated Jan. 27, 2020, 18 pages.

(Continued)

*Primary Examiner* — Peter G Leigh
(74) *Attorney, Agent, or Firm* — Burr & Forman LLP

(57) ABSTRACT

Apparatus for an aerosol generating device comprises a circuit comprising an inductive element for heating a susceptor arrangement to heat an aerosol generating material. The apparatus also comprises a controller configured to determine a change in an electrical parameter of the circuit when the circuit is changed between an unloaded state wherein the susceptor arrangement is not inductively coupled to the inductive element, and a loaded state wherein the susceptor arrangement is inductively coupled to the inductive element. The controller is configured to determine a property of the susceptor arrangement from the change in the electrical parameter of the circuit.

29 Claims, 3 Drawing Sheets

(51) Int. Cl.

| | |
|---|---|
| ***H05B 6/06*** | (2006.01) |
| ***H05B 6/10*** | (2006.01) |
| *A24F 40/53* | (2020.01) |

(58) Field of Classification Search

USPC .......................................................... 131/329

See application file for complete search history.

(56) References Cited

U.S. PATENT DOCUMENTS

| | | | |
|---|---|---|---|
| 2017/0055585 | A1 | 3/2017 | Fursa et al. |
| 2017/0311648 | A1 | 11/2017 | Gill et al. |

FOREIGN PATENT DOCUMENTS

| | | | | | |
|---|---|---|---|---|---|
| WO | WO2015177265 | A1 | | 11/2015 | |
| WO | WO-2016029225 | A1 | * | 2/2016 | A24F 40/50 |
| WO | WO-2016058904 | A1 | * | 4/2016 | A24F 40/40 |
| WO | WO2016150922 | A2 | | 9/2016 | |
| WO | WO-2017085242 | A1 | * | 5/2017 | |
| WO | WO-2018096000 | A1 | * | 5/2018 | A24F 40/465 |
| WO | WO-2018122410 | A1 | * | 7/2018 | A24F 40/10 |
| WO | WO-2018122412 | A1 | * | 7/2018 | A24F 40/50 |

OTHER PUBLICATIONS

International Preliminary Examiner Authority, International Application No. PCT/EP20169/073260, dated Dec. 7, 2020, 16 pages.

* cited by examiner

APPARATUS FOR AN AEROSOL GENERATING DEVICE

CROSS-REFERENCE TO RELATED APPLICATIONS

The present application is a National Phase entry of PCT Application No. PCT/EP2019/073260, filed Aug. 30, 2019, which claims priority from Great Britain Patent Application No. 1814198.6 filed Aug. 31, 2018, each of which is fully incorporated herein by reference.

TECHNICAL FIELD

The present invention relates to apparatus for an aerosol generating device, in particular, apparatus for determining a property of a susceptor arrangement for use with the aerosol generating device.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

According to a first aspect of the present invention, there is provided apparatus for an aerosol generating device, the apparatus comprising: a circuit comprising an inductive element for heating a susceptor arrangement to heat an aerosol generating material; and a controller configured to: determine a change in an electrical parameter of the circuit when the circuit is changed between an unloaded state wherein the susceptor arrangement is not inductively coupled to the inductive element, and a loaded state wherein the susceptor arrangement is inductively coupled to the inductive element; and determine a property of the susceptor arrangement from the change in the electrical parameter of the circuit.

The circuit may be changed from the unloaded state to the loaded state when the susceptor arrangement is received by the device, and the circuit may be changed from the loaded state to the unloaded state when the susceptor arrangement is removed from the device.

The change in the electrical parameter may be determined by comparing a value of the parameter measured when the circuit is in the loaded state to a value of the parameter measured when the circuit is in the unloaded state.

The change in the electrical parameter may be determined by comparing: a value of the parameter measured when the circuit is in the loaded state, to a predetermined value of the parameter corresponding to the circuit in the unloaded state.

Determining the property of the susceptor arrangement may comprise comparing the determined change in the value of the electrical parameter to a list of at least one stored value, wherein the property of the susceptor arrangement is indicated by determining to which value in the list the determined change corresponds.

The controller may be configured to allow activation of the aerosol generating device for use or not allow activation of the aerosol generating device for use depending on the determined property of the susceptor arrangement.

The controller may be configured to determine a property of the susceptor arrangement based on the magnitude of the change in the electrical parameter of the circuit.

The controller may be configured to determine a property of the susceptor arrangement based on the sign of the change in the electrical parameter of the circuit.

The property of the susceptor arrangement may be whether or not the susceptor arrangement is present in the device, and the controller may be configured to determine that the susceptor arrangement is present in the device based on whether a change in the electrical parameter is present.

The apparatus may comprise a temperature measuring device and the controller may be configured to receive a measured temperature of the susceptor arrangement from the temperature measuring device at a time when the circuit is changed between the loaded state and the unloaded state and use the measured temperature of the susceptor arrangement in determining the property of the susceptor arrangement.

The susceptor arrangement may be in a consumable comprising the aerosol generating material to be heated and the controller may be configured to determine a property of the consumable from the determined property of the susceptor arrangement.

The property of the consumable may comprise an indicator of whether the consumable is an approved consumable or not an approved consumable, and the controller may be configured to determine whether or not the consumable is an approved consumable and activate the device for use if the consumable is an approved consumable and not activate the device for use if the consumable is not an approved consumable.

The electrical parameter may be a resonant frequency of the circuit.

The electrical parameter may be an effective grouped resistance r of the inductive element and the susceptor arrangement.

The apparatus may further comprise a capacitive element and a switching arrangement for enabling a varying current to be generated from a DC voltage supply and flow through the inductive element; and the controller may be configured to determine the effective resistance r from a frequency of the varying current being supplied to the inductive element, a DC current from the DC voltage supply, and a DC voltage of the DC voltage supply, and wherein the effective grouped resistance r of the inductive element and susceptor arrangement is determined by the controller according to the relationship:

$$r = \frac{I_s}{V_s}\frac{1}{(2\pi f_0 C)^2}$$

where $V_s$ is the DC voltage and $I_s$ is the DC current, C is a capacitance of the circuit, and $f_0$ is the frequency of the varying current being supplied to the inductive element.

According to a second aspect of the present invention there is provided a method of determining a property of a susceptor arrangement for an aerosol generating device, wherein the susceptor arrangement is for heating an aerosol generating material, and the aerosol generating device comprises a controller and a circuit comprising an inductive element for heating the susceptor, wherein the method comprises: determining, by the controller, a change in an electrical parameter of the circuit when the circuit is changed between an unloaded state wherein the susceptor arrangement is not inductively coupled to the inductive element, and a loaded state wherein the susceptor arrangement is inductively coupled to the inductive element; and determining, by the controller, the property of the susceptor arrangement from the change in the electrical parameter of the circuit.

The susceptor arrangement may be in a consumable comprising aerosol generating material to be heated and the method may comprise determining a property of the consumable from the property of the susceptor arrangement.

According to a third aspect of the present invention there is provided a controller for an aerosol generating device, wherein the controller is configured to perform a method according to the second aspect.

According to a fourth aspect of the present invention there is provided an aerosol generating device comprising apparatus according to the first aspect.

According to a fifth aspect of the present invention there is provided a set of machine readable instructions which when executed by a controller in an aerosol generating device cause the controller to execute a method according to the second aspect.

DETAILED DESCRIPTION OF THE DRAWINGS

Figure 1:
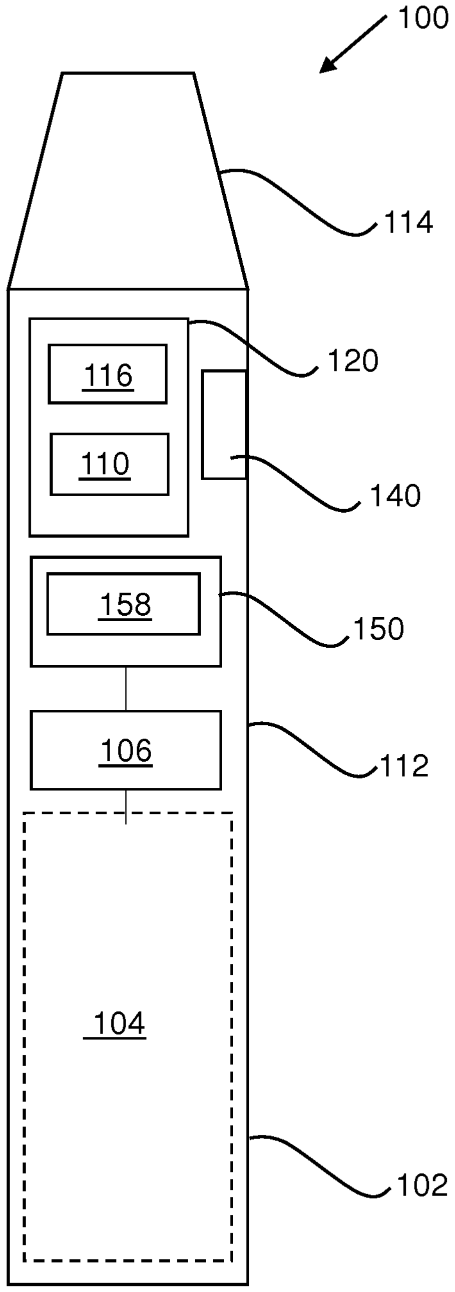
FIG. 1 illustrates schematically an aerosol generating device according to an example.

Induction heating is a process of heating an electrically conducting object (or susceptor) by electromagnetic induction. An induction heater may comprise an inductive element, for example, an inductive coil and a device for passing a varying electric current, such as an alternating electric current, through the inductive element. The varying electric current in the inductive element produces a varying magnetic field. The varying magnetic field penetrates a susceptor suitably positioned with respect to the inductive element, generating eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field.

In inductive heating, as compared to heating by conduction for example, heat is generated inside the susceptor, allowing for rapid heating. Further, there need not be any physical contact between the inductive heater and the susceptor, allowing for enhanced freedom in construction and application.

An induction heater may comprise an LC circuit, having an inductance L provided by an induction element, for example the electromagnet which may be arranged to inductively heat a susceptor, and a capacitance C provided by a capacitor. The circuit may in some cases be represented as an RLC circuit, comprising a resistance R provided by a resistor. In some cases, resistance is provided by the ohmic resistance of parts of the circuit connecting the inductor and the capacitor, and hence the circuit need not necessarily include a resistor as such. Such a circuit may be referred to, for example as an LC circuit. Such circuits may exhibit electrical resonance, which occurs at a particular resonant frequency when the imaginary parts of impedances or admittances of circuit elements cancel each other.

One example of a circuit exhibiting electrical resonance is an LC circuit, comprising an inductor, a capacitor, and optionally a resistor. One example of an LC circuit is a series circuit where the inductor and capacitor are connected in series. Another example of an LC circuit is a parallel LC circuit where the inductor and capacitor are connected in parallel. Resonance occurs in an LC circuit because the collapsing magnetic field of the inductor generates an electric current in its windings that charges the capacitor, while the discharging capacitor provides an electric current that builds the magnetic field in the inductor. An example parallel LC circuit is described herein. When a parallel LC circuit is driven at the resonant frequency, the dynamic impedance of the circuit is at a maximum (as the reactance of the inductor equals the reactance of the capacitor), and circuit current is at a minimum. However, for a parallel LC circuit, the parallel inductor and capacitor loop acts as a current multiplier (effectively multiplying the current within the loop and thus the current passing through the inductor). Driving the RLC or LC circuit at or near the resonant frequency may therefore provide for effective and/or efficient inductive heating by providing for the greatest value of the magnetic field penetrating the susceptor.

A transistor is a semiconductor device for switching electronic signals. A transistor typically comprises at least three terminals for connection to an electronic circuit. In some prior art examples, an alternating current may be supplied to a circuit using a transistor by supplying a drive signal which causes the transistor to switch at a predetermined frequency, for example at the resonant frequency of the circuit.

A field effect transistor (FET) is a transistor in which the effect of an applied electric field may be used to vary the effective conductance of the transistor. The field effect transistor may comprise a body B, a source terminal S, a drain terminal D, and a gate terminal G. The field effect transistor comprises an active channel comprising a semiconductor through which charge carriers, electrons or holes, may flow between the source S and the drain D. The conductivity of the channel, i.e. the conductivity between the drain D and the source S terminals, is a function of the potential difference between the gate G and source S terminals, for example generated by a potential applied to the gate terminal G. In enhancement mode FETs, the FET may be OFF (i.e. substantially prevent current from passing therethrough) when there is substantially zero gate G to source S voltage, and may be turned ON (i.e. substantially allow current to pass therethrough) when there is a substantially non-zero gate G-source S voltage.

An n-channel (or n-type) field effect transistor (n-FET) is a field effect transistor whose channel comprises an n-type semiconductor, where electrons are the majority carriers and holes are the minority carriers. For example, n-type semiconductors may comprise an intrinsic semiconductor (such as silicon for example) doped with donor impurities (such as phosphorus for example). In n-channel FETs, the drain terminal D is placed at a higher potential than the source terminal S (i.e. there is a positive drain-source voltage, or in other words a negative source-drain voltage). In order to turn an n-channel FET "on" (i.e. to allow current to pass therethrough), a switching potential is applied to the gate terminal G that is higher than the potential at the source terminal S.

A p-channel (or p-type) field effect transistor (p-FET) is a field effect transistor whose channel comprises a p-type semiconductor, where holes are the majority carriers and electrons are the minority carriers. For example, p-type semiconductors may comprise an intrinsic semiconductor (such as silicon for example) doped with acceptor impurities (such as boron for example). In p-channel FETs, the source terminal S is placed at a higher potential than the drain terminal D (i.e. there is a negative drain-source voltage, or in other words a positive source-drain voltage). In order to turn a p-channel FET "on" (i.e. to allow current to pass therethrough), a switching potential is applied to the gate terminal G that is lower than the potential at the source terminal S (and which may for example be higher than the potential at the drain terminal D).

A metal-oxide-semiconductor field effect transistor (MOSFET) is a field effect transistor whose gate terminal G is electrically insulated from the semiconductor channel by an insulating layer. In some examples, the gate terminal G may be metal, and the insulating layer may be an oxide (such as silicon dioxide for example), hence "metal-oxide-semiconductor." However, in other examples, the gate may be made from other materials than metal, such as polysilicon, and/or the insulating layer may be made from other materials than oxide, such as other dielectric materials. Such devices are nonetheless typically referred to as metal-oxide-semiconductor field effect transistors (MOSFETs), and it is to be understood that as used herein the term metal-oxide-semiconductor field effect transistors or MOSFETs is to be interpreted as including such devices.

A MOSFET may be an n-channel (or n-type) MOSFET where the semiconductor is n-type. The n-channel MOSFET (n-MOSFET) may be operated in the same way as described above for the n-channel FET. As another example, a MOSFET may be a p-channel (or p-type) MOSFET, where the semiconductor is p-type. The p-channel MOSFET (p-MOSFET) may be operated in the same way as described above for the p-channel FET. An n-MOSFET typically has a lower source-drain resistance than that of a p-MOSFET. Hence in an "on" state (i.e. where current is passing therethrough), n-MOSFETs generate less heat as compared to p-MOSFETs, and hence may waste less energy in operation than p-MOSFETs. Further, n-MOSFETs typically have shorter switching times (i.e. a characteristic response time from changing the switching potential provided to the gate terminal G to the MOSFET changing whether or not current passes therethrough) as compared to p-MOSFETs. This can allow for higher switching rates and improved switching control.

FIG. 1 illustrates schematically an aerosol generating device 100, according to an example. The aerosol generating device 100 comprises a DC power source 104, in this example a battery 104, a circuit 150 comprising an inductive element 158, a susceptor arrangement 110, and aerosol generating material 116.

In the example of FIG. 1, the susceptor arrangement 110 is located within a consumable 120 along with the aerosol generating material 116. The DC power source 104 is electrically connected to the circuit 150 and is arranged to provide DC electrical power to the circuit 150. The device 100 also comprises control circuitry 106, also referred to herein as a controller. In this example the circuit 150 is connected to the power source 104 such as a battery via the control circuitry 106.

The control circuitry 106 may comprise means for switching the device 100 on and off, for example in response to a user input. The control circuitry 106 may for example comprise a puff detector (not shown), as is known per se, and/or may take user input via at least one button or touch control (not shown). The control circuitry 106 may comprise means for monitoring the temperature of components of the device 100 or components of a consumable 120 inserted in the device. In addition to the inductive element 158, the circuit 150 comprises other components which are described below.

The inductive element 158 may be, for example, a coil, which may for example be planar. The inductive element 158 may, for example, be formed from copper (which has a relatively low resistivity). The circuitry 150 is arranged to convert an input DC current from the DC power source 104 into a varying, for example alternating, current through the inductive element 158. The circuitry 150 is arranged to drive the varying current through the inductive element 158.

The susceptor arrangement 110 is arranged relative to the inductive element 158 for inductive energy transfer from the inductive element 158 to the susceptor arrangement 110. The susceptor arrangement 110 may be formed from any suitable material that can be inductively heated, for example a metal or metal alloy, e.g., steel. In some implementations, the susceptor arrangement 110 may comprise or be entirely formed from a ferromagnetic material, which may comprise one or a combination of example metals such as iron, nickel and cobalt. In some implementations, the susceptor arrangement 110 may comprise or be formed entirely from a non-ferromagnetic material, for example aluminum. The inductive element 158, having varying current driven therethrough, causes the susceptor arrangement 110 to heat up by Joule heating and/or by magnetic hysteresis heating, as described above. The susceptor arrangement 110 is arranged to heat the aerosol generating material 116, for example by conduction, convection, and/or radiation heating, to generate an aerosol in use. In some examples, the susceptor arrangement 110 and the aerosol generating material 116 form an integral unit that may be inserted and/or removed from the aerosol generating device 100, and may be disposable. In some examples, the inductive element 158 may be removable from the device 100, for example for replacement. The aerosol generating device 100 may be hand-held. The aerosol generating device 100 may be arranged to heat the aerosol generating material 116 to generate aerosol for inhalation by a user.

It is noted that, as used herein, the term "aerosol generating material" includes materials that provide volatilized components upon heating, typically in the form of vapor or an aerosol. Aerosol generating material may be a non-tobacco-containing material or a tobacco-containing material. For example, the aerosol generating material may be or comprise tobacco. Aerosol generating material may, for example, include one or more of tobacco per se, tobacco derivatives, expanded tobacco, reconstituted tobacco, tobacco extract, homogenized tobacco or tobacco substitutes. The aerosol generating material can be in the form of ground tobacco, cut rag tobacco, extruded tobacco, reconstituted tobacco, reconstituted material, liquid, gel, gelled sheet, powder, or agglomerates, or the like. Aerosol generating material also may include other, non-tobacco, products, which, depending on the product, may or may not contain nicotine. Aerosol generating material may comprise one or more humectants, such as glycerol or propylene glycol.

Returning to FIG. 1, the aerosol generating device 100 comprises an outer body 112 housing the DC power supply 104, the control circuitry 106 and the circuit 150 comprising the inductive element 158. The consumable 120 comprising the susceptor arrangement 110 and the aerosol generating material 116 in this example is also inserted into the body 112 to configure the device 100 for use. The outer body 112 comprises a mouthpiece 114 to allow aerosol generated in use to exit the device 100.

In use, a user may activate, for example via a button (not shown) or a puff detector (not shown), the circuitry 106 to cause a varying, e.g. alternating, current to be driven through the inductive element 108, thereby inductively heating the susceptor arrangement 110, which in turn heats the aerosol generating material 116, and causes the aerosol generating material 116 thereby to generate an aerosol. The aerosol is generated into air drawn into the device 100 from an air inlet (not shown), and is thereby carried to the mouthpiece 104, where the aerosol exits the device 100 for inhalation by a user.

The circuit 150 comprising the inductive element 158, and the susceptor arrangement 110 and/or the device 100 as a whole may be arranged to heat the aerosol generating material 116 to a range of temperatures to volatilize at least one component of the aerosol generating material 116 without combusting the aerosol generating material. For example, the temperature range may be about 50° C. to about 350° C., such as between about 50° C. and about 300° C., between about 100° C. and about 300° C., between about 150° C. and about 300° C., between about 100° C. and about 200° C., between about 200° C. and about 300° C., or between about 150° C. and about 250° C. In some examples, the temperature range is between about 170° C. and about 250° C. In some examples, the temperature range may be other than this range, and the upper limit of the temperature range may be greater than 300° C.

It will be appreciated that there may be a difference between the temperature of the susceptor arrangement 110 and the temperature of the aerosol generating material 116, for example during heating up of the susceptor arrangement 110, for example where the rate of heating is large. It will therefore be appreciated that in some examples the temperature at which the susceptor arrangement 110 is heated to may, for example, be higher than the temperature to which it is desired that the aerosol generating material 116 is heated.

Figure 2:
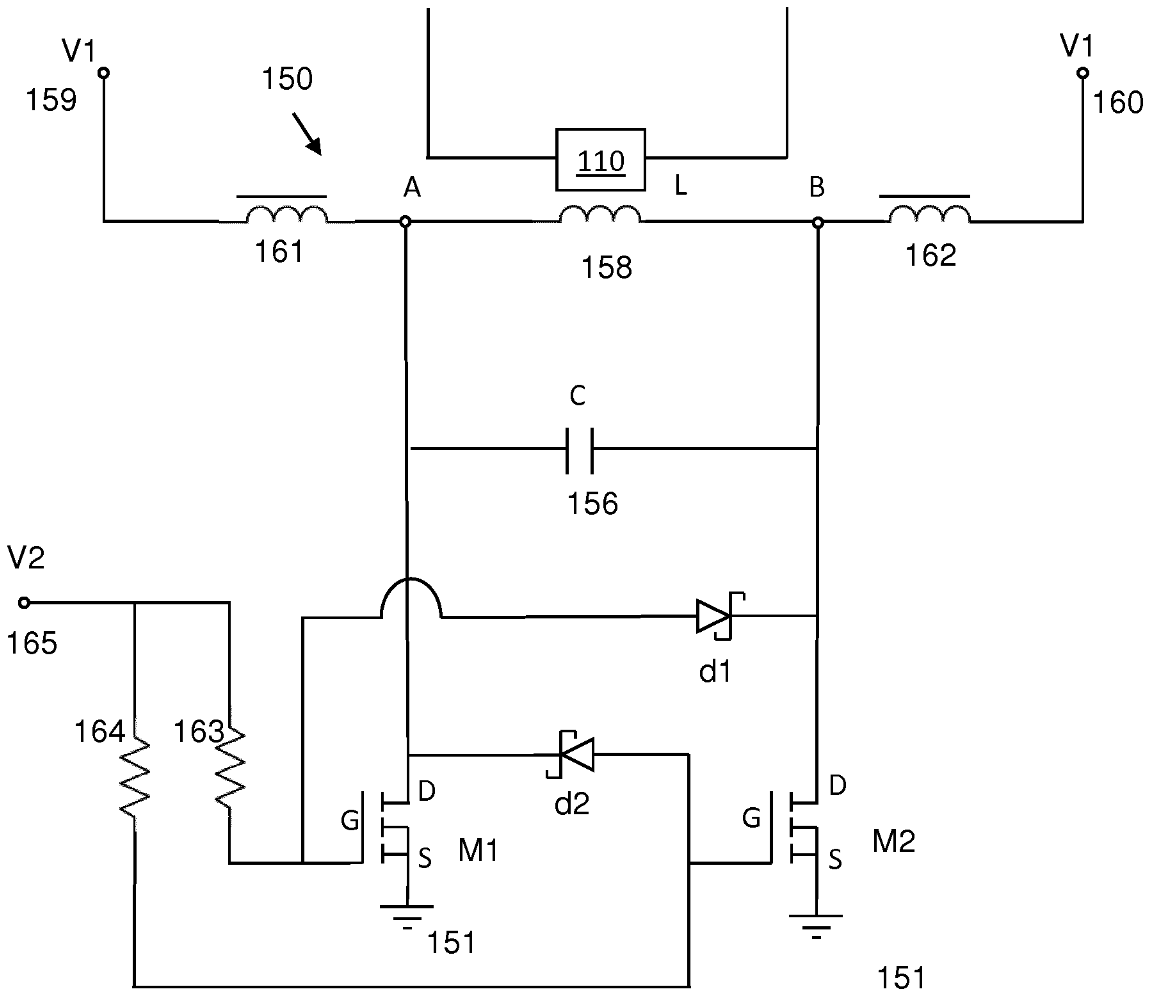
FIG. 2 illustrates schematically a resonant circuit according to an example.

Referring now to FIG. 2, there is illustrated an example circuit 150, which is a resonant circuit, for inductive heating of the susceptor arrangement 110. The resonant circuit 150 comprises the inductive element 158 and a capacitor 156, connected in parallel.

The resonant circuit 150 comprises a switching arrangement M1, M2 which, in this example, comprises a first transistor M1 and a second transistor M2. The first transistor M1 and the second transistor M2 each comprise a first terminal G, a second terminal D and a third terminal S. The second terminals D of the first transistor M1 and the second transistor M2 are connected to either side of the parallel inductive element 158 and the capacitor 156 combination, as will be explained in more detail below. The third terminals S of the first transistor M1 and the second transistor M2 are each connected to earth 151. In the example illustrated in FIG. 2 the first transistor M1 and the second transistor M2 are both MOSFETS and the first terminals G are gate terminals, the second terminals D are drain terminals and the third terminals S are source terminals.

It will be appreciated that in alternative examples other types of transistors may be used in place of the MOSFETs described above.

The resonant circuit 150 has an inductance L and a capacitance C. The inductance L of the resonant circuit 150 is provided by the inductive element 158, and may also be affected by an inductance of the susceptor arrangement 110 which is arranged for inductive heating by the inductive element 158. The inductive heating of the susceptor arrangement 110 is via a varying magnetic field generated by the inductive element 158, which, in the manner described above, induces Joule heating and/or magnetic hysteresis losses in the susceptor arrangement 110. A portion of the inductance L of the resonant circuit 150 may be due to the magnetic permeability of the susceptor arrangement 110. The varying magnetic field generated by the inductive element 158 is generated by a varying, for example alternating, current flowing through the inductive element 158.

The inductive element 158 may, for example, be in the form of a coiled conductive element. For example, inductive element 158 may be a copper coil. The inductive element 158 may comprise, for example, multi-stranded wire, such as Litz wire, for example a wire comprising a number of individually insulated wires twisted together. The AC resistance of a multi-stranded wire is a function of frequency and the multi-stranded wire can be configured in such a way that the power absorption of the inductive element is reduced at a driving frequency. As another example, the inductive element 158 may be a coiled track on a printed circuit board, for example. Using a coiled track on a printed circuit board may be useful as it provides for a rigid and self-supporting track, with a cross section which obviates any requirement for multi-stranded wire (which may be expensive), which can be mass produced with a high reproducibility for low cost. Although one inductive element 158 is shown, it will be readily appreciated that there may be more than one inductive element 158 arranged for inductive heating of one or more susceptor arrangements 110.

The capacitance C of the resonant circuit 150 is provided by the capacitor 156. The capacitor 156 may be, for example, a Class 1 ceramic capacitor, for example a COG type capacitor. The total capacitance C may also comprise the stray capacitance of the resonant circuit 150; however, this is or can be made negligible compared with the capacitance provided by the capacitor 156.

The resistance of the resonant circuit 150 is not shown in FIG. 2 but it should be appreciated that a resistance of the circuit may be provided by the resistance of the track or wire connecting the components of the circuit 150, the resistance of the inductor 158, and/or the resistance to current flowing through the circuit 150 provided by the susceptor arrangement 110 arranged for energy transfer with the inductor 158. In some examples, one or more dedicated resistors (not shown) may be included in the resonant circuit 150.

The resonant circuit 150 is supplied with a DC supply voltage V1 provided from the DC power source 104 (see FIG. 1), e.g. from a battery. A positive terminal of the DC voltage supply V1 is connected to the resonant circuit 150 at a first point 159 and at a second point 160. A negative terminal (not shown) of the DC voltage supply V1 is connected to earth 151 and hence, in this example, to the source terminals S of both the MOSFETs M1 and M2. In examples, the DC supply voltage V1 may be supplied to the resonant circuit directly from a battery or via an intermediary element.

The resonant circuit 150 may therefore be considered to be connected as an electrical bridge with the inductive element 158 and the capacitor 156 in parallel connected between the two arms of the bridge. The resonant circuit 150 acts to produce a switching effect, described below, which results in alternating current being drawn through the inductive element 158, thus creating the alternating magnetic field and heating the susceptor arrangement 110.

The first point 159 is connected to a first node A located at a first side of the parallel combination of the inductive element 158 and the capacitor 156. The second point 160 is connected to a second node B, to a second side of the parallel combination of the inductive element 158 and the capacitor 156. A first choke inductor 161 is connected in series between the first point 159 and the first node A, and a second choke inductor 162 is connected in series between the second point 160 and the second node B. The first and second chokes 161 and 162 act to filter out AC frequencies from entering the circuit from the first point 159 and the second point 160 respectively but allow DC current to be drawn into and through the inductor 158. The chokes 161 and 162 allow the voltage at A and B to oscillate with little or no visible effects at the first point 159 or the second point 160.

In this particular example, the first MOSFET M1 and the second MOSFET M2 are n-channel enhancement mode MOSFETs. The drain terminal of the first MOSFET M1 is connected to the first node A via a conducting wire or the like, while the drain terminal of the second MOSFET M2 is connected to the second node B, via a conducting wire or the like. The source terminal of each MOSFET M1, M2 is connected to earth 151.

The resonant circuit 150 comprises a second voltage source V2, gate voltage supply (or sometimes referred to herein as a control voltage), with its positive terminal connected at a third point 165 which is used for supplying a voltage to the gate terminals G of the first and second MOSFETs M1 and M2. The control voltage V2 supplied at the third point 165 in this example is independent of the voltage V1 supplied at the first and second points 159, 160, which enables variation of voltage V1 without impacting the control voltage V2. A first pull-up resistor 163 is connected between the third point 165 and the gate terminal G of the first MOSFET M1. A second pull-up resistor 164 is connected between the third point 165 and the gate terminal G of the second MOSFET M2.

In other examples, a different type of transistor may be used, such as a different type of FET. It will be appreciated that the switching effect described below can be equally achieved for a different type of transistor which is capable of switching from an "on" state to an "off" state. The values and polarities of the supply voltages V1 and V2 may be chosen in conjunction with the properties of the transistor used, and the other components in the circuit. For example, the supply voltages may be chosen in dependence on whether an n-channel or p-channel transistor is used, or in dependence on the configuration in which the transistor is connected, or the difference in the potential difference applied across terminals of the transistor which results in the transistor being in either on or off.

The resonant circuit 150 further comprises a first diode d1 and a second diode d2, which in this example are Schottky diodes, but in other examples any other suitable type of diode may be used. The gate terminal G of the first MOSFET M1 is connected to the drain terminal D of the second MOSFET M2 via the first diode d1, with the forward direction of the first diode d1 being towards the drain D of the second MOSFET M2.

The gate terminal G of the second MOSFET M2 is connected to the drain D of the first second MOSFET M1 via the second diode d2, with the forward direction of the second diode d2 being towards the drain D of the first MOSFET M1. The first and second Schottky diodes d1 and d2 may have a diode threshold voltage of around 0.3V. In other examples, silicon diodes may be used having a diode threshold voltage of around 0.7V. In examples, the type of diode used is selected in conjunction with the gate threshold voltage, to allow desired switching of the MOSFETs M1 and M2. It will be appreciated that the type of diode and gate supply voltage V2 may also be chosen in conjunction with the values of pull-up resistors 163 and 164, as well as the other components of the resonant circuit 150.

The resonant circuit 150 supports a current through the inductive element 158 which is a varying current due to switching of the first and second MOSFETs M1 and M2. Since in this example the MOSFETs M1 and M2 are enhancement mode MOSFETS, when a voltage applied at the gate terminal G of one of the MOSFETs is such that a gate-source voltage is higher than a predetermined threshold for that MOSFET, the MOSFET is turned to the ON state. Current may then flow from the drain terminal D to the source terminal S which is connected to ground 151. The series resistance of the MOSFET in this ON state is negligible for the purposes of the operation of the circuit, and the drain terminal D can be considered to be at ground potential when the MOSFET is in the ON state. The gate-source threshold for the MOSFET may be any suitable value for the resonant circuit 150 and it will be appreciated that the magnitude of the voltage V2 and resistances of resistors 164 and 163 are chosen dependent on the gate-source threshold voltage of the MOSFETs M1 and M2, essentially so that voltage V2 is greater than the gate threshold voltage(s).

The switching procedure of the resonant circuit 150 which results in varying current flowing through the inductive element 158 will now be described starting from a condition where the voltage at first node A is high and the voltage at the second node B is low.

When the voltage at node A is high, the voltage at the drain terminal D of the first MOSFET M1 is also high because the drain terminal of M1 is connected, directly in this example, to the node A via a conducting wire. At the same time, the voltage at the node B is held low and the voltage at the drain terminal D of the second MOSFET M2 is correspondingly low (the drain terminal of M2 being, in this example, directly connected to the node B via a conducting wire).

Accordingly, at this time, the value of the drain voltage of M1 is high and is greater than the gate voltage of M2. The second diode d2 is therefore reverse-biased at this time. The gate voltage of M2 at this time is greater than the source terminal voltage of M2, and the voltage V2 is such that the gate-source voltage at M2 is greater than the ON threshold for the MOSFET M2. M2 is therefore ON at this time.

At the same time, the drain voltage of M2 is low, and the first diode d1 is forward biased due to the gate voltage supply V2 to the gate terminal of M1. The gate terminal of M1 is therefore connected via the forward biased first diode d1 to the low voltage drain terminal of the second MOSFET M2, and the gate voltage of M1 is therefore also low. In other words, because M2 is on, it is acting as a ground clamp, which results in the first diode d1 being forward biased, and the gate voltage of M1 being low. As such, the gate-source voltage of M1 is below the ON threshold and the first MOSFET M1 is OFF.

In summary, at this point the circuit 150 is in a first state, wherein:

voltage at node A is high;
voltage at node B is low;
first diode d1 is forward biased;
second MOSFET M2 is ON;
second diode d2 is reverse biased; and
first MOSFET M1 is OFF.

From this point, with the second MOSFET M2 being in the ON state, and the first MOSFET M1 being in the OFF state, current is drawn from the supply V1 through the first choke 161 and through the inductive element 158. Due to the presence of inducting choke 161, the voltage at node A is free to oscillate. Since the inductive element 158 is in parallel with the capacitor 156, the observed voltage at node A follows that of a half sinusoidal voltage profile. The frequency of the observed voltage at node A is equal to the resonant frequency $f_0$ of the circuit 150.

The voltage at node A reduces sinusoidally in time from its maximum value towards 0 as a result of the energy decay at node A. The voltage at node B is held low (because MOSFET M2 is on) and the inductor L is charged from the DC supply V1. The MOSFET M2 is switched off at a point in time when the voltage at node A is equal to or below the gate threshold voltage of M2 plus the forward bias voltage of d2. When the voltage at node A has finally reached zero, the MOSFET M2 will be fully off.

At the same time, or shortly after, the voltage at node B is taken high. This happens due to the resonant transfer of energy between the inductive element 158 and the capacitor 156. When the voltage at node B becomes high due to this resonant transfer of energy, the situation described above with respect to the nodes A and B and the MOSFETs M1 and M2 is reversed. That is, as the voltage at A reduces towards zero, the drain voltage of M1 is reduced. The drain voltage of M1 reduces to a point where the second diode d2 is no longer reverse biased and becomes forward biased. Similarly, the voltage at node B rises to its maximum and the first diode d1 switches from being forward biased to being reverse biased. As this happens, the gate voltage of M1 is no longer coupled to the drain voltage of M2 and the gate voltage of M1 therefore becomes high, under the application of gate supply voltage V2. The first MOSFET M1 is therefore switched to the ON state, since its gate-source voltage is now above the threshold for switch-on. As the gate terminal of M2 is now connected via the forward biased second diode d2 to the low voltage drain terminal of M1, the gate voltage of M2 is low. M2 is therefore switched to the OFF state.

In summary, at this point the circuit 150 is in a second state, wherein:

voltage at node A is low;
voltage at node B is high;
first diode d1 is reverse biased;
second MOSFET M2 is OFF;
second diode d2 is forward biased; and
first MOSFET M1 is ON.

At this point, current is drawn through the inductive element 158 from the supply voltage V1 through the second choke 162. The direction of the current has therefore reversed due to the switching operation of the resonant circuit 150. The resonant circuit 150 will continue to switch between the above-described first state in which the first MOSFET M1 is OFF and the second MOSFET M2 is ON, and the above-described second state in which the first MOSFET M1 is ON and the second MOSFET M2 is OFF.

In the steady state of operation, energy is transferred between the electrostatic domain (i.e., in the capacitor 156) and the magnetic domain (i.e., the inductor 158), and vice versa.

The net switching effect is in response to the voltage oscillations in the resonant circuit 150 where we have an energy transfer between the electrostatic domain (i.e., in the capacitor 156) and the magnetic domain (i.e., the inductor 158), thus creating a time-varying current in the parallel LC circuitry, which varies at the resonant frequency of the resonant circuit 150. This is advantageous for energy transfer between the inductive element 158 and the susceptor arrangement 110 since the circuitry 150 operates at its optimal efficiency level and therefore achieves more efficient heating of the aerosol generating material 116 compared to circuitry operating off resonance. The described switching arrangement is advantageous as it allows the circuit 150 to drive itself at the resonant frequency under varying load conditions. What this means is that in the event that the properties of the circuitry 150 change (for example if the susceptor 110 is present or not, or if the temperature of the susceptor changes, or even physical movement of the susceptor element 110), the dynamic nature of the circuitry 150 continuously adapts its resonant point to transfer energy in an optimal fashion, thus meaning that the circuitry 150 is always driven at resonance. Moreover, the configuration of the circuit 150 is such that no external controller or the like is required to apply the control voltage signals to the gates of the MOSFETS to effect the switching.

In examples described above, with reference to FIG. 2, the gate terminals G are supplied with a gate voltage via a second power supply which is different to the power supply for the source voltage V1. However, in some examples, the gate terminals may be supplied with the same voltage supply as the source voltage V1. In such examples, the first point 159, second point 160 and third point 165 in the circuit 150 may, for example, be connected to the same power rail. In such examples, it will be appreciated that the properties of the components of the circuit must be chosen to allow the described switching action to take place. For example, the gate supply voltage and diode threshold voltages should be chosen such that the oscillations of the circuit trigger switching of the MOSFETs at the appropriate level. The provision of separate voltage values for the gate supply voltage V2 and the source voltage V1 allows for the source voltage V1 to be varied independently of the gate supply voltage V2 without affecting the operation of the switching mechanism of the circuit.

The resonant frequency $f_0$ of the circuit 150 may be in the MHz range, for example in the range 0.5 MHz to 4 MHz, for example in the range 2 MHz to 3 MHz. It will be appreciated that the resonant frequency $f_0$ of the resonant circuit 150 is dependent on the inductance L and capacitance C of the circuit 150, as set out above, which in turn is dependent on the inductive element 158, capacitor 156 and additionally the susceptor arrangement 110. As such, the resonant frequency $f_0$ of the circuit 150 can vary from implementation to implementation. For example, the frequency may be in the range 0.1 MHz to 4 MHz, or in the range of 0.5 MHz to 2 MHz, or in the range 0.3 MHz to 1.2 MHz. In other examples, the resonant frequency may be in a range different from those described above. Generally, the resonant frequency will depend on the characteristics of the circuitry, such as the electrical and/or physical properties of the components used, including the susceptor arrangement 110.

It will also be appreciated that the properties of the resonant circuit 150 may be selected based on other factors for a given susceptor arrangement 110. For example, in order to improve the transfer of energy from the inductive element 158 to the susceptor arrangement 110, it may be useful to select the skin depth (i.e. the depth from the surface of the susceptor arrangement 110 within which the current density falls by a factor of 1/e, which is at least a function of frequency) based on the material properties of the susceptor arrangement 110. The skin depth differs for different materials of susceptor arrangements 110, and reduces with increasing drive frequency. On the other hand, for example, in order to reduce the proportion of power supplied to the resonant circuit 150 and/or driving element 102 that is lost as heat within the electronics, it may be beneficial to have a circuit which drives itself at relatively lower frequencies. Since the drive frequency is equal to the resonant frequency in this example, the considerations here with respect to drive frequency are made with respect to obtaining the appropriate resonant frequency, for example by designing a susceptor arrangement 110 and/or using a capacitor 156 with a certain capacitance and an inductive element 158 with a certain inductance. In some examples, a compromise between these factors may therefore be chosen as appropriate and/or desired.

The resonant circuit 150 of FIG. 2 has a resonant frequency $f_0$ at which the current I is maximized and the dynamic impedance is maximized. The resonant circuit 150 drives itself at this resonant frequency and therefore the oscillating magnetic field generated by the inductor 158 is maximum, and the inductive heating of the susceptor arrangement 110 by the inductive element 158 is maximized.

In some examples, inductive heating of the susceptor arrangement 110 by the resonant circuit 150 may be controlled by controlling the supply voltage provided to the resonant circuit 150, which in turn may control the current flowing in the resonant circuit 150, and hence may control the energy transferred to the susceptor arrangement 110 by the resonant circuit 150, and hence the degree to which the susceptor arrangement 110 is heated. In other examples, it will be appreciated that the temperature of the susceptor arrangement 110 may be monitored and controlled by, for example, changing the voltage supply (e.g., by changing the magnitude of the voltage supplied or by changing the duty cycle of a pulse width modulated voltage signal) to the inductive element 158 depending on whether the susceptor arrangement 110 is to be heated to a greater or lesser degree.

As mentioned above, the inductance L of the resonant circuit 150 is provided by the inductive element 158 arranged for inductive heating of the susceptor arrangement 110. At least a portion of the inductance L of resonant circuit 150 is due to the magnetic permeability of the susceptor arrangement 110. The inductance L, and hence resonant frequency $f_0$ of the resonant circuit 150 may therefore depend on the specific susceptor(s) used and its positioning relative to the inductive element(s) 158, which may change from time to time. Further, the magnetic permeability of the susceptor arrangement 110 may vary with varying temperatures of the susceptor 110.

In examples described herein the susceptor arrangement 110 is contained within a consumable and is therefore replaceable. For example, the susceptor arrangement 110 may be disposable and for example integrated with the aerosol generating material 116 that it is arranged to heat. The resonant circuit 150 allows for the circuit to be driven at the resonance frequency, automatically accounting for differences in construction and/or material type between different susceptor arrangements 110, and/or differences in the placement of the susceptor arrangements 110 relative to the inductive element 158, as and when the susceptor arrangement 110 is replaced. Furthermore, the resonant circuit is configured to drive itself at resonance regardless of the specific inductive element 158, or indeed any component of the resonant circuit 150 used. This is particularly useful to accommodate for variations in manufacturing both in terms of the susceptor arrangement 110 but also with regards to the other components of the circuit 150. For example, the resonant circuit 150 allows the circuit to remain driving itself at the resonant frequency regardless of the use of different inductive elements 158 with different values of inductance, and/or differences in the placement of the inductive element 158 relative to the susceptor arrangement 110. The circuit 150 is also able to drive itself at resonance even if the components are replaced over the lifetime of the device.

Operation of the aerosol generating device 100 comprising resonant circuit 150, will now be described, according to an example. Before the device 100 is turned on, the device 100 may be in an 'off' state, i.e. no current flows in the resonant circuit 150. The device 150 is switched to an 'on' state, for example by a user turning the device 100 on. Upon switching on of the device 100 the resonant circuit 150 begins drawing current from the voltage supply 104, with the current through the inductive element 158 varying at the resonant frequency $f_0$. The device 100 may remain in the on state until a further input is received by the controller 106, for example until the user no longer pushes the button (not shown), or the puff detector (not shown) is no longer activated, or until a maximum heating duration has elapsed. The resonant circuit 150 being driven at the resonant frequency $f_0$ causes an alternating current I to flow in the resonant circuit 150 and the inductive element 158, and hence for the susceptor arrangement 110, to be inductively heated. As the susceptor arrangement 110 is inductively heated, its temperature (and hence the temperature of the aerosol generating material 116) increases. In this example, the susceptor arrangement 110 (and aerosol generating material 116) is heated such that it reaches a steady temperature $T_{MAX}$. The temperature $T_{MAX}$ may be a temperature which is substantially at or above a temperature at which a substantial amount of aerosol is generated by the aerosol generating material 116. The temperature Tuff may be between around 200 and around 300° C. for example (although of course may be a different temperature depending on the material 116, susceptor arrangement 110, the arrangement of the overall device 100, and/or other requirements and/or conditions). The device 100 is therefore in a 'heating' state or mode, wherein the aerosol generating material 116 reaches a temperature at which aerosol is substantially being produced, or a substantial amount of aerosol is being produced. It should be appreciated that in most, if not all cases, as the temperature of the susceptor arrangement 110 changes, so too does the resonant frequency $f_0$ of the resonant circuit 150. This is because magnetic permeability of the susceptor arrangement 110 is a function of temperature and, as described above, the magnetic permeability of the susceptor arrangement 110 influences the coupling between the inductive element 158 and the susceptor arrangement 110, and hence the resonant frequency $f_0$ of the resonant circuit 150.

The present disclosure predominantly describes an LC parallel circuit arrangement. As mentioned above, for an LC parallel circuit at resonance, the impedance is maximum and the current is minimum. Note that the current being minimum generally refers to the current observed outside of the parallel LC loop, e.g., to the left of choke 161 or to the right of choke 162. Conversely, in a series LC circuit, current is at maximum and, generally speaking, a resistor is required to be inserted to limit the current to a safe value which can otherwise damage certain electrical components within the circuit. This generally reduces the efficiency of the circuit because energy is lost through the resistor. A parallel circuit operating at resonance does not require such restrictions.

In some examples, the susceptor arrangement 110 comprises or consists of aluminum. Aluminum is an example of a non-ferrous material and as such has a relative magnetic permeability close to one. What this means is that aluminum has a generally low degree of magnetization in response to an applied magnetic field. Hence, it has generally been considered difficult to inductively heat aluminum, particularly at low voltages such as those used in aerosol provision systems. It has also generally been found that driving circuitry at resonant frequency is advantageous as this provides optimum coupling between the inductive element 158 and susceptor arrangement 110. For aluminum, it is observed that a slight deviation from the resonant frequency causes a noticeable reduction in the inductive coupling between the susceptor arrangement 110 and the inductive element 158, and thus a noticeable reduction in the heating efficiency (in some cases to the extent where heating is no longer observed). As mentioned above, as the temperature of the susceptor arrangement 110 changes, so too does the resonant frequency of the circuit 150. Therefore, in the case where the susceptor arrangement 110 comprises or consists of a non-ferrous susceptor, such as aluminum, the resonant circuit 150 of the present disclosure is advantageous in that the circuitry is always driven at the resonant frequency (independent of any external control mechanism). This means that maximum inductive coupling and thus maximum heating efficiency is achieved at all times enabling aluminum to be efficiently heated. It has been found that a consumable including an aluminum susceptor can be heated efficiently when the consumable includes an aluminum wrap forming a closed electrical circuit and/or having a thickness of less than 50 microns.

In examples where the susceptor arrangement 110 forms part of a consumable, the consumable may take the form of that described in PCT/EP2016/070178, the entirety of which is incorporated herein by reference.

The device 100 is provided with a temperature determiner for, in use, determining a temperature of the susceptor arrangement 110. As is illustrated in FIG. 1, the temperature determiner may be the control circuitry 106, for example, a processor that controls the overall operation of the device 100. The temperature determiner 106 determines a temperature of the susceptor arrangement 110 based on a frequency that the resonant circuit 150 is being driven at, a DC current from the DC voltage supply V1 and a DC voltage of the DC voltage supply V1.

Without wishing to be bound by theory, the following description explains the derivation of relationships between electrical and physical properties of the resonant circuit 150 which allow the temperature of the susceptor arrangement 110 in examples described herein to be determined.

In use, the impedance at resonance of the parallel combination of the inductive element 158 and the capacitor 156 is the dynamic impedance $R_{dyn}$.

As explained above, the action of the switching arrangement M1 and M2 results in a DC current drawn from the DC voltage source V1 being converted into an alternating current that flows through the inductive element 158 and capacitor 156. An induced alternating voltage is also generated across the inductive element 158 and the capacitor 156.

As a result of the oscillatory nature of the resonant circuit 150, the impedance looking into the oscillatory circuit is $R_{dyn}$ for a given source voltage $V_s$ (of the voltage source V1). A current $I_s$ will be drawn in response to $R_{dyn}$. Therefore, the impedance of the load $R_{dyn}$ of the resonant circuit 150 may be equated with the impedance of the effective voltage and current draw. This allows the impedance of the load to be determined via determination, for example measuring values, of the DC voltage $V_s$ and the DC current $I_s$, as per equation (1) below.

$$R_{dyn} = \frac{V_s}{I_s} \tag{1}$$

At the resonant frequency $f_0$, the dynamic impedance $R_{dyn}$ is $$R_{dyn} = \frac{L}{Cr} \tag{2}$$

where the parameter r can be considered to represent the effective grouped resistance of the inductive element 158 and the influence of the susceptor arrangement 110 (when present), and, as described above, L is the inductance of the inductive element 158, and C is the capacitance of the capacitor 156. The parameter r is described herein as an effective grouped resistance. As will be appreciated from the description below, the parameter r has units of resistance (Ohms), but in certain circumstances may not be considered to represent a physical/real resistance of the circuit 150.

As described above, the inductance of the inductive element 158 here takes into the account the interaction of the inductive element 158 with the susceptor arrangement 110. As such, the inductance L depends on the properties of the susceptor arrangement 110 and position of the susceptor arrangement 110 relative to the inductive element 158. The inductance L of the inductive element 158 and hence of the resonant circuit 150 is dependent on, amongst other factors, the magnetic permeability μ of the susceptor arrangement 110. Magnetic permeability μ is a measure of the ability of a material to support the formation of a magnetic field within itself and expresses the degree of magnetization that a material obtains in response to an applied magnetic field. The magnetic permeability μ of a material from which the susceptor arrangement 110 is comprised may change with temperature.

From equations (1) and (2) the following equation (3) can be obtained $$r = \frac{LI_s}{CV_s} \tag{3}$$

The relation of the resonant frequency $f_0$ to the inductance L and capacitance C can be modelled in at least two ways, given by equations (4a and 4b) below.

$$f_0 = \frac{1}{2\pi\sqrt{LC}} \tag{4a}$$

$$f_0 = \frac{1}{2\pi L}\sqrt{\frac{L}{C} - r^2} \tag{4b}$$

Equation (4a) represents the resonant frequency as modelled using a parallel LC circuit comprising an inductor L and a capacitor C, whereas Equation (4b) represents the resonant frequency as modelled using a parallel LC circuit with an additional resistor r in series with the inductor L. It should be appreciated for Equation (4b) that as r tends to zero, Equation (4b) tends to Equation (4a).

In the following, we assume that r is small and hence we can make use of Equation (4a). As will be described below, this approximation works well as it combines the changes within the circuit 150 (e.g., in inductance and temperature) within the representation of L. From equations (3) and (4a) the following expression can be obtained $$r = \frac{I_s}{V_s}\frac{1}{(2\pi f_0 C)^2} \tag{5}$$

It will be appreciated that Equation (5) provides an expression for the parameter r in terms of measurable or known quantities. It should be appreciated here that the parameter r is influenced by the inductive coupling in the resonant circuit 150. When loaded, i.e., when a susceptor arrangement is present, it may not be the case that we can consider the value of the parameter r to be small. In which case, the parameter r may no longer be an exact representation of the group resistances, but is instead a parameter which is influenced by the effective inductive coupling in the circuit 150. The parameter r is said to be a dynamic parameter, which is dependent on the properties of the susceptor arrangement 110, as well as the temperature T of the susceptor arrangement. The value of DC source $V_s$ is known (e.g. a battery voltage) or may be measured by a voltmeter and the value of the DC current $I_s$ drawn from the DC voltage source V1 may be measured by any suitable means, for example by use of a voltmeter appropriately placed to measure the source voltage $V_s$.

The frequency $f_0$ may be measured and/or determined to allow then the parameter r to be obtained.

In one example, the frequency $f_0$ may be measured via use of a frequency-to-voltage (F/V) converter 210. The F/V converter 210 may, for example, be coupled to a gate terminal of one of the first MOSFET M1 or the second MOSFET M2. In examples where other types of transistors are used in the switching mechanism of the circuit, the F/V converter 210 may be coupled to a gate terminal, or other terminal which provides a periodic voltage signal with frequency equal to the switching frequency of one of the transistors. The F/V converter 210 therefore may receive a signal from the gate terminal of one of the MOSFET M1, M2 representative of the resonance frequency $f_0$ of the resonant circuit 150. The signal received by the F/V converter 210 may be approximately a square-wave representation with a period representative of the resonant frequency of the resonant circuit 210. The F/V converter 210 may then use this period to represent the resonant frequency $f_0$ based on an output voltage.

Accordingly, as C is known from the value of the capacitance of the capacitor 156, and $V_s$, $I_s$, and $f_0$ can be measured, for example as described above, the parameter r can be determined from these measured and known values.

The parameter r changes as a function of temperature, and further as a function of the inductance L. This means that the parameter r has a first value when the resonant circuit 150 is in an "unloaded" state, i.e. when the inductive element 158 is not inductively coupled to the susceptor arrangement 110, and the value of r changes when the circuit moves into a "loaded" state, i.e. when the inductive element 158 and susceptor arrangement 110 are inductively coupled with each other. Similarly, as described above, the value of the resonant frequency $f_0$ changes as a function of temperature, and further as a function of the inductance L.

In an example, the controller 106 is configured to determine a change in an electrical parameter of the circuit when the circuit is changed between the unloaded state and the loaded state. In essence, any given electrical parameter of the circuit 150 which can be measured and shows a change between the loaded and unloaded states can be used by the controller 106. In one example, the electrical parameter used is the resonant frequency of the circuit. In another example, the electrical parameter used is the parameter r. By determining a change in the given electrical parameter, the controller 106 may determine a property of the susceptor arrangement 110 which has been coupled to the inductive element 158. In examples, the properties of a susceptor arrangement 110, for example the type of material the susceptor arrangement 110 is formed from, or the size or shape of the susceptor arrangement 110, affect the change in the electrical parameter when the susceptor arrangement 110 is coupled to the inductive element 158. Certain properties of the susceptor arrangement 110, and/or of a consumable containing the susceptor arrangement 110, may therefore, in examples, be determined by determining or measuring a change in a given electrical parameter.

In examples, the circuit 150 may be changed from the unloaded state to the loaded state when a consumable containing the susceptor arrangement 110 is received by the device 100, for example when the consumable is inserted into the device 100. The circuit 150 may similarly be changed from the loaded state to the unloaded state when the consumable is removed from the device 100. In the unloaded state, a given electrical parameter may take a first value, while in the loaded state the given electrical parameter may take a different value. As such, in an example, the change in the given electrical parameter between the unloaded state and the loaded state may indicate to the controller 106 the type of susceptor arrangement 110 present in the consumable. Hence, depending on the change in the given electrical parameter, the controller 106 is configured to determine a type of consumable which has been received by the aerosol generating device 100. In some implementations, a range of consumables e.g., having different tobacco blends, or different flavors, may be provided with different susceptor arrangements 110 which can subsequently be used to identify the consumable.

In an example, the controller 106 may have access to a predetermined list or table of values of changes in the electrical parameter, wherein the list comprises at least one value of a change in the electrical parameter with each value being associated with a type of consumable. Therefore, a measurement of the change in the given electrical parameter may be associated, e.g. via a look-up table, with a particular type of consumable. The change in the electrical parameter may be a change in magnitude of the electrical parameter, for example a change in the magnitude of the resonant frequency of the circuit 150, or of the parameter r, upon the circuit 150 being changed between the loaded and unloaded states. In some implementations, the sign of the change (i.e., a positive or negative with respect to the unloaded state) is alternatively or additionally taken into account when determining the susceptor arrangement and thus consumable type. For example, it has been found for an aluminum-containing susceptor arrangement that the frequency increases from that of an unloaded state to a loaded state. Without wishing to be bound by theory, this is thought to be due to the fact that aluminum has a relative permeability of 1 or close to 1, i.e. a low and is thus non-ferritic. Susceptor arrangements comprising other non-ferritic materials may similarly cause a resonant frequency of the circuit to increase when going from the unloaded state to the loaded state. Conversely, it has been found that for a ferritic material, e.g. iron, containing susceptor arrangement (which has a relative permeability greater than 1, for instance of several tens or several hundreds), the frequency decreases from an unloaded to a loaded state. Thus, the sign of the change in the electrical parameter may also be used to determine a property of the susceptor arrangement 110. For example, the sign of the change of resonant frequency upon going from the unloaded to the loaded state may be used to determine if the susceptor arrangement 110 comprises a material with a low relative permeability or a material with a high relative permeability. In certain examples, the behavior of the resonant frequency or other electrical parameters of the circuit upon going between a loaded and an unloaded state may differ depending on properties of the circuit, such as the resonant frequency of the circuit in the unloaded state. For example, the magnitude or sign in the change in resonant frequency of the circuit when going between the loaded and unloaded states may differ dependent on the resonant frequency of the circuit.

To give an example, a particular consumable may be of a particular size and comprise a particular type and amount of aerosol generating material, and comprise an aluminum susceptor arrangement 110 of a particular size and shape. The look-up table may hold a value for the magnitude of the change in resonant frequency of the circuit 150 which occurs when the circuit 150 is changed between the loaded and unloaded states by introduction of this consumable. This value may, for example, be stored in the look-up table in an initial setup of the circuit 150, where the type of consumable is known and the change in electrical parameter it effects in the circuit 150 is measured. The controller 106 may therefore determine the change in parameter r when the circuit 150 has been changed to the loaded state by introduction of the consumable. By looking up the consumable type associated with the determined change in the parameter r in the look-up table, the type of consumable loaded into the device 100 is determined. It will be appreciated that the above description applies mutatis mutandis where the electrical parameter is the resonant frequency $f_0$ of the circuit 150.

It should also be appreciated that there may be some slight variation in the change of the electrical parameter between consumables of the same type. For example, for susceptor arrangements 110 of the same type, there may be slight manufacturing discrepancies in the materials used (e.g., purities or defects), and the overall shape of the susceptor arrangement (e.g., a tube susceptor may end up with a slightly elliptical cross section) may impact on the change in the electrical parameter. These are discrepancies caused by the manufacture of the susceptor arrangement itself. Additionally, there may be discrepancies based on the alignment of the susceptor arrangement 110 with the consumable (e.g., how much the susceptor deviates from the axes of the consumable) and/or the alignment of the consumable within the device relative to the inductive element 158, and again these discrepancies can affect the change in the electrical parameter. These discrepancies are caused by the manufacture of the consumable and/or device themselves. Hence, in some implementations, the look-up table mentioned above may account for these discrepancies, e.g., by specifying a range of values that satisfy each criterion of the look-up table. Alternatively, the controller 106 may implement an algorithm to identify the closest values from the look-up table.

It should also be appreciated that, in particular with circuitry 150, the susceptor arrangement 110 is gradually heated once the susceptor arrangement 110 is in the loaded state and the circuitry is switched on. As discussed above, during heating, the resonant frequency changes depending upon temperature. Thus, depending on when the measurement of the given electrical parameter is made, there may also be some variation in the change of the electrical parameter due to heating. In this case, either each device can be calibrated to take into account the measurement time, or the look-up table can be modified to account for differences in measurement times.

In an example, using the determined change in the electrical parameter, the controller 106 may determine whether or not to allow activation of the aerosol generating device 100 for use with a received consumable. For example, the determined change in electrical parameter may be used to indicate whether the consumable is a consumable which is approved for use with the aerosol generating device 100. The table may hold a list of one or more approved consumables and the controller 106 may activate the device 100 for use only if the consumable is determined to be an approved consumable. Approved susceptor-containing consumables may be manufactured with a known value for the change in electrical parameter that they cause in the circuit 150. For instance, a known value of the change in resonant frequency, or of the change in parameter r caused by that consumable.

In examples, using the determined change in the electrical parameter, the controller 106 may determine a heating mode for the device 100 to use with a received consumable. For example, the determined change in electrical parameter may be used to indicate a type of the received consumable, e.g. the material and/or size of the susceptor arrangement and/or a type or amount of aerosol generating material in the consumable, and the controller 106 may select an appropriate mode of operation for heating the received consumable based on the determined change in the electrical parameter. For example, different heating profiles may be suitable for heating of different types of consumable and the controller 106 may select a suitable heating profile based on a determination of the properties of the received consumable. In a similar manner to as has been described above, a look-up table accessible by the controller 106 may hold a list of one or more types of consumable and one of more corresponding heating modes for each type of consumable.

In one implementation, the controller 106 may determine the change in the value of the electrical parameter by measuring the electrical parameter in the unloaded state and comparing this to a measurement of the electrical parameter in the loaded state. In other words, the controller 106 may be configured to activate the inductive element 158 (in other words, supply power to the inductive element 158) when the device is in the unloaded state to obtain a measure of the electrical parameter in the unloaded state, and to activate the inductive element 158 when the device is in the loaded state to obtain a measure of the electrical parameter in the loaded state. In one implementation, the controller 106 is configured to supply power to the inductive element 158 in a continuous manner (e.g., when a user switches on the device, such as through activation of a button), and is arranged to monitor the electrical parameter for a subsequent change in the electrical parameter (which can indicate that the device is now in the loaded state). The controller may monitor the electrical parameter continuously or intermittently. Alternatively, the controller 106 is arranged to intermittently supply power to the inductive element 158, at a set intermission period, say once every second, and measure the electrical parameter at a corresponding timing. When there is a change in the electrical parameter between two measurements, this can indicate that the device is in the loaded state and the change in the electrical parameter, as described above, can be used to identify the consumable. Broadly, the controller 106 may therefore determine the change in the value of the electrical parameter by measuring the electrical parameter when the circuit 150 is in the loaded state and comparing this measured value to a value of the electrical parameter which is measured when the circuit 150 is in the unloaded state. In other words, the controller 106 may be configured to activate the inductive element 158 (in other words, supply power to the inductive element 158) when the device 100 is in the unloaded state to obtain a measure of the electrical parameter in the unloaded state, and to activate the inductive element 158 when the device 100 is in the loaded state to obtain a measure of the electrical parameter in the loaded state. For example, the controller 106 may measure the resonant frequency using a F/V converter, or measure the parameter r of the unloaded circuit 150 as described herein, e.g. using Equation 5, when the inductive element 158 is supplied with power. The electrical parameter may be measured again when the circuit 150 is brought into the loaded state, and the two measured values compared to determine the change, for example a change in magnitude, in the electrical parameter. The measurement of the electrical parameter in the unloaded state may, for example, be made when the device 100 is powered on but no susceptor arrangement 110 is inserted. As described herein, the controller 106 may determine whether the device 100 is in the loaded state or the unloaded state by any suitable means, such as via an optical sensor or a capacitive sensor which senses the insertion of a consumable, or alternatively the value of the electrical parameter, or a change therein, may indicate that the device 100 has switched between the loaded and unloaded states. The controller 106 may, as such, associate measurements of the electrical parameter with either the loaded or unloaded state.

In another example, the controller 106 may measure the electrical parameter when the circuit 150 is in the loaded state, e.g. as described above, and compare this measured value for the loaded state to a predetermined value of the electrical parameter for the unloaded state. That is, a value for the electrical parameter in the unloaded state may be predetermined and accessible to the controller 106 when determining the change in the electrical parameter. In examples, the value of the electrical parameter in the unloaded state may be a fixed value which is stored in a memory accessible by the controller 106. For example, the value of the electrical parameter in the unloaded state may be a value determined based on the properties of circuit 150, or a value measured for the circuit 150 during an initial configuring of the circuit 150. In another example, a value of the electrical parameter for the unloaded state may be measured as described herein and stored for re-use in subsequent determinations of a change in the electrical parameter upon loading/unloading of a consumable containing the susceptor arrangement 110. As such, if the device 101 is powered on with a susceptor arrangement 110 already received by the device 100, the controller 106 may measure a value of the electrical parameter (i.e. a value of the circuit 150 in the loaded state) and compare this to a predetermined value of the electrical parameter when the circuit 150 is in the unloaded state. The controller 106 may determine that the measured value corresponds to the loaded state either via input from a sensor (not shown) that senses a susceptor arrangement 110/consumable is received by the device 100 or in other examples may determine that the circuit 150 is in the loaded state by the magnitude of the electrical parameter itself. For example, the circuit 150 may store a known value for the circuit 150 in the unloaded state and may determine that the circuit 150 is in the loaded state is the measured value of the electrical parameter differs by a certain amount from the known value for the unloaded state.

Figure 3:
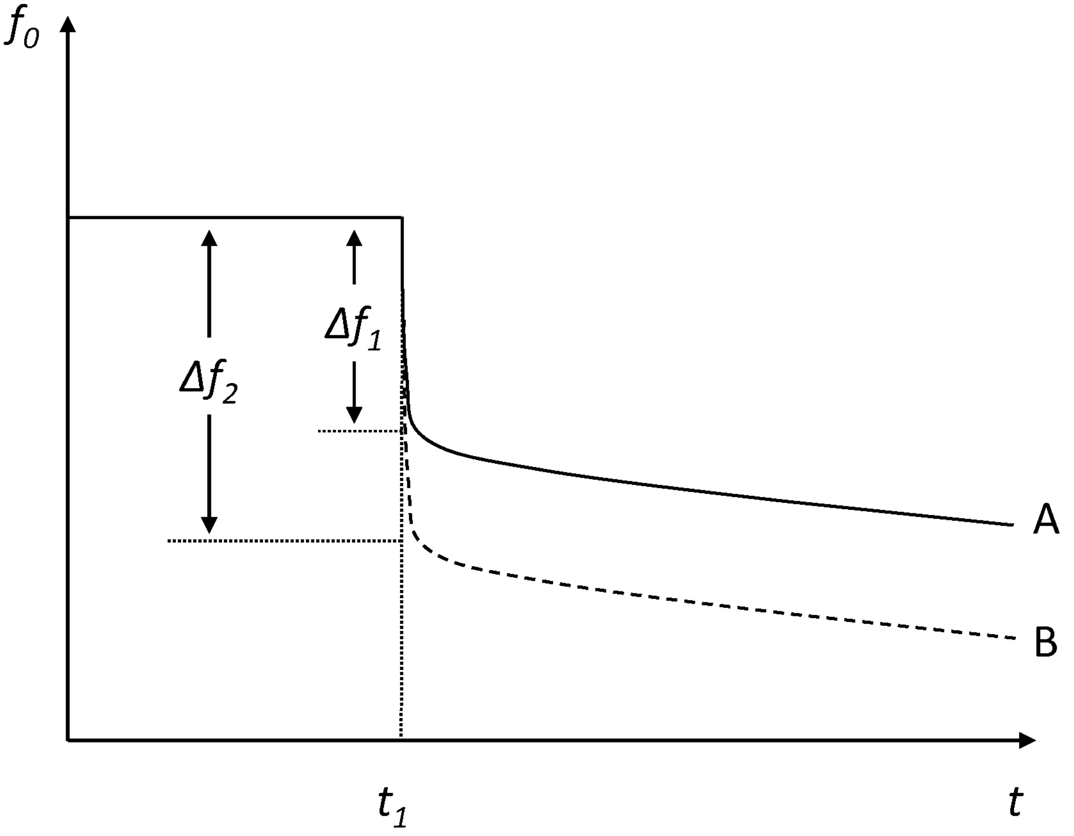
FIG. 3 shows plots of resonant frequency of the resonant circuit of FIG. 2 against time, according to an example.

FIG. 3 shows an example representation of a usage session of the aerosol generating device 100 in which the circuit 150 is changed from the unloaded state to the loaded state by a susceptor arrangement 110 being brought into interaction with the inductive element 158. FIG. 3 shows time along the horizontal axis and the resonant frequency of the circuit 150 along the vertical axis.

In FIG. 3, two plots A and B are shown, which correspond respectively to a first susceptor arrangement 110 in a first consumable and a second susceptor arrangement 110 is a second consumable. For each plot, before time $t_1$ the circuit 150 is in the unloaded state and has a resonant frequency $f_{unloaded}$. As mentioned above, this resonant frequency is a property of the circuitry 150 and depends at least on the components of the circuit 150. At time $t_1$ a consumable is inserted into the device 100. The first plot A is a solid line and corresponds to the insertion at $t_1$ of a first consumable comprising a first susceptor arrangement 110. The second plot B is a dashed line and corresponds to the insertion at $t_1$ of a second consumable comprising a second susceptor arrangement 110. At time $t_1$, the time of insertion, in the examples shown in FIG. 3, the circuit 150 is changed to the loaded state, and the resonant frequency of the circuit 150 changes. In this example, the susceptor arrangements 110 have a relative permeability greater than 1, which means that the resonant frequency decreases from an unloaded state to a loaded state. For the first consumable, let us assume that the expected change in resonant frequency when going from the unloaded to the loaded state is $\Delta f_1$. For the second consumable, let us assume that the expected change in resonant frequency when going from the unloaded to the loaded state is $\Delta f_2$. In an example, therefore, the values $\Delta f_1$ and $\Delta f_2$ are stored in a look-up table accessible to the controller 106, and these values are associated with the first consumable and the second consumable respectively. Upon loading of a consumable, the controller 106 may then determine the change in the resonant frequency, which is the difference between the unloaded resonant frequency $f_{unloaded}$ and the measured loaded resonant frequency $f_{loaded}$, of the circuit 150 and look up the determined change in resonant frequency in the look-up table. If the determined change in resonant frequency corresponds to $\Delta f_1$ the controller 106 determines that the consumable inserted is the first consumable. If the measured change in frequency corresponds to $\Delta f_2$ the controller determines that the consumable inserted is the second consumable. The reduction with time of the resonant frequency for each of the plots A and B after the time $t_1$ corresponds to a reduction in the resonant frequency with increasing temperature of the susceptor arrangement 110 and consumable. That is, in the plots A and B, the inserted consumable is heated from insertion at time $t_1$ and thus the resonant frequency $f_0$ decreases from that time, in both cases.

Once it is determined, or can be assumed, that the resonant circuit 150 is in the loaded state, with a susceptor arrangement 110 inductively coupled to the inductive element 158, a change in the parameter r can be assumed to be indicative of a change in temperature of the susceptor arrangement 110. For example, the change in r may be considered indicative of heating of the susceptor arrangement 110 by the inductive element 158, rather than a change of the circuit between loaded and unloaded states.

In an example, the aerosol generating device comprises 100 a temperature sensor 140 for measuring a temperature indicative of a temperature of the susceptor arrangement 110 upon being loaded into the device 100, i.e. at time $t_1$ in FIG. 3. The temperature sensor 140 may provide this measured temperature to the controller 106. The controller 106 may use the temperature provided by the temperature sensor 140 to provide a correction to the change in the electrical parameter which is measured by the controller 106. That is, the resonant frequency for the circuit 150 when loaded with a particular consumable is dependent on the temperature of the consumable at the time the measurement is made; the same applies for the parameter r. As such, in order to compare the change in the electrical parameter when the consumable is inserted into the device 100, and thereby identify the consumable, the controller 106 may be configured to make a correction to the measured value of the electrical parameter to account for the temperature of the consumable/susceptor arrangement 110. The correction may be made based on a calibration curve (not shown) of temperature against resonant frequency or parameter r for the circuit 150 loaded with a particular type of consumable. The calibration curve may be obtained by a calibration performed on the resonant circuit 150 itself (or on an identical test circuit used for calibration purposes) by measuring the temperature T of the susceptor arrangement 110 with a suitable temperature sensor such as a thermocouple, at multiple given values of the parameter r, and taking a plot of r against T. For example, a number of values for the change in electrical parameter may be stored in the look-up table upon setup, each corresponding to a different measured susceptor temperature (which is also stored in the table). When looking up the change in electrical parameter in the table, the controller 106 may in such examples also use the measured temperature in the look-up operation. In another example, an equation defining how the change in electrical parameter varies with susceptor arrangement 110 temperature may be determined, either experimentally or theoretically, and this equation applied by the controller 106 to correct the measured value of the change in the electrical parameter for looking-up in the table. As such, the controller 106 may make an accurate determination of the type of consumable received by the device 100, accounting for the temperature of the susceptor arrangement 110 upon insertion.

In some examples a calibration curve such as has been described above may be pre-loaded on the device 100 and may be configured to take into account variances in the device 100. For example, certain properties of the device 100 may vary between copies of the device 100 due to variations within manufacturing tolerances. A calibration curve may be loaded on each copy of the device 100 which takes into account these variances. Similarly, the calibration curve may take into account variances between different consumables of the same type. For example, certain properties such as the weight or composition of consumables of a certain type may vary slightly, e.g. due to tolerances in the manufacturing process. The calibration curve may take into account such variations. In other examples, each individual device 100 may be separately calibrated during the manufacturing process. This may allow for the variation between devices to be reflected in a calibration curve specific to the particular device to which the calibration corresponds.

In yet another example, a calibration curve for the device 100 may be determined when the device 100 is in use by a user. For example, the device 100 may be configured to determine values for the parameter r when the device 100 is first operated by a user and temperature values corresponding to the determined values of the parameter r to thereby obtain the calibration curve. The temperature values may be obtained, for example, using the temperature sensor 140. In another example, a temperature value may be obtained using another indicator of a temperature of the susceptor arrangement, for example a property of the heating profile which indicates that the susceptor arrangement is at a known temperature. In one example this process could be performed only the first time the device 100 is operated by the user and the calibration curve generated by this process could be used for subsequent times the device 100 is operated. In another example, the calibration process could be performed multiple times, for example upon each use of the device 100.

In one example, the temperature sensor 140 may be a sensor which is configured to detect a temperature ambient to the device 100. The controller 106 may receive the temperature detected by the temperature sensor 140 and use this in making a correction to the measured change in the electrical parameter for comparison to a look-up table value. As such, the controller 106 may, in effect, assume that the temperature of the susceptor arrangement 110 upon being received by the device 100 is equal to the ambient temperature. In another example, the aerosol provision device 100 comprises a chamber for receiving the susceptor arrangement 110, e.g. a consumable comprising the susceptor arrangement 110, and the temperature sensor 140 may detect the temperature of the chamber prior to insertion the consumable and use this detected temperature in making the correction.

FIG. 3 above describes the situation in which the resonant frequency of the circuit 150 changes by a different amount (e.g., $\Delta f_1$ or $\Delta f_2$) depending on the properties of the susceptor arrangement 110, or the relative placement of the susceptor arrangement 110, etc. However, it should be appreciated that the change in resonant frequency between unloaded and loaded states may be affected by other aspects. For example, the voltage supplied to the circuit 150 may influence the change in resonant frequency. For instance, if 4 volts are supplied to the circuit 150, the change in resonant frequency between unloaded and loaded states may be larger than if 3 volts is supplied to the circuit 150. Hence, when determining a property of the susceptor arrangement 110 from a change in the electrical parameter of the circuit (e.g., resonant frequency or the parameter r), the controller may be configured to take into account other parameters of the circuit 150, such as the voltage and/or current supplied to the circuit 150, to determine the property of the susceptor arrangement. In an example that makes use of a look-up table, the look-up table may include entries for different susceptor arrangements 110 at different voltages. This observation also enables parameters of the circuit 150 to be calibrated; for example the change in frequency at different voltages may enable different electrical characteristics of the circuit 150 to be checked or derived, e.g., by solving simultaneous equations.

While it has been described above that the control circuitry makes use of Equations 4a and 5, e.g. to determine the parameter r, it should be appreciated that other equations achieving the same or similar effect may be used in accordance with the principles of the present disclosure. In one example, $R_{dyn}$ can be calculated based on the AC values of the current and voltage in the circuit 150. For example, the voltage at node A can be measured and, it has been found that this is different from $V_s$—we call this voltage $V_{AC}$. $V_{AC}$ can be measured practically by any suitable means, but is the AC voltage within the parallel LC loop. Using this, one can determine an AC current, $I_{AC}$, by equating the AC and DC power. That is, $V_{AC}I_{AC}=V_SI_S$. The parameters $V_s$ and $I_s$ can be substituted with their AC equivalents in Equation 5, or any other suitable equation for the parameter r. It should be appreciated that a different set of calibration curves may be realized in this case.

While the above description has described the operation of the temperature measurement concept in the context of the circuit 150 which is configured to self-drive at the resonant frequency, the above described concepts are also applicable to an induction heating circuit which is not configured to be driven at the resonant frequency. For example, the above described method of determining a property of the susceptor arrangement 110 from the change in an electrical parameter of the circuit 150 when the device 100 is changed between the loaded and unloaded states may be employed with an induction heating circuit which is driven at a predetermined frequency, which may not be the resonant frequency of that induction heating circuit. In one such example, the induction heating circuit may be driven via an H-Bridge, comprising a switching mechanism such as a plurality of MOSFETs. The H-Bridge may be controlled, via a microcontroller or the like to use a DC voltage to supply an alternating current to the inductor coil at a switching frequency of the H-Bridge, set by the microcontroller. In such an example, the above relations set out in equations (1) to (5) are assumed to hold and provide a valid, e.g. usable, estimate of the parameter r and susceptor temperature T for frequencies in a range of frequencies including the resonant frequency.

In some examples, the method may comprise assigning $V_s$ and $I_s$ constant values and assuming that these values do not change in calculating the parameter r. The voltage $V_s$ and the current $I_s$ may then need not be measured in order to estimate the temperature of the susceptor. For example, the voltage and current may be approximately known from the properties of the power source and the circuit and may be assumed to be constant over the range of temperatures used. In such examples, the temperature T may then be estimated by measuring only the frequency at which the circuit is operating and using assumed or previously measured values for the voltage and current. The invention thus may provide for a method of determining the temperature of the susceptor by measuring the frequency of operation of the circuit. In some implementations, the invention thus may provide for a method of determining the temperature of the susceptor by only measuring the frequency of operation of the circuit.

The above examples are to be understood as illustrative examples of the invention. It is to be understood that any feature described in relation to any one example may be used alone, or in combination with other features described, and may also be used in combination with one or more features of any other of the examples, or any combination of any other of the other examples. Furthermore, equivalents and modifications not described above may also be employed without departing from the scope of the invention, which is defined in the accompanying claims.

The invention claimed is:

1. An apparatus for an aerosol generating device, the apparatus comprising:

a circuit comprising an inductive element for heating a susceptor arrangement to heat an aerosol generating material; and a controller configured to:

determine a change in an electrical parameter of the circuit when the circuit is changed between an unloaded state wherein the susceptor arrangement is not inductively coupled to the inductive element, and a loaded state wherein the susceptor arrangement is inductively coupled to the inductive element; and determine a property of the susceptor arrangement from the change in the electrical parameter of the circuit, wherein the electrical parameter is one of a resonant frequency of the circuit and an effective grouped resistance r of the inductive element and the susceptor arrangement.

2. The apparatus according to claim 1, wherein:

the circuit is changed from the unloaded state to the loaded state when the susceptor arrangement is received by the device, and the circuit is changed from the loaded state to the unloaded state when the susceptor arrangement is removed from the device.

3. The apparatus according to claim 1, wherein the change in the electrical parameter is determined by comparing a value of the parameter measured when the circuit is in the loaded state to a value of the parameter measured when the circuit is in the unloaded state.

4. The apparatus according to claim 1, wherein the change in the electrical parameter is determined by comparing a value of the parameter measured when the circuit is in the loaded state to a predetermined value of the parameter corresponding to the circuit in the unloaded state.

5. The apparatus according to claim 1, wherein determining the property of the susceptor arrangement comprises comparing the determined change in the value of the electrical parameter to a list of at least one stored value, wherein the property of the susceptor arrangement is indicated by determining to which value in the list the determined change corresponds.

6. The apparatus according to claim 1, wherein the controller is configured to allow activation of the aerosol generating device for use or not allow activation of the aerosol generating device for use depending on the determined property of the susceptor arrangement.

7. The apparatus according to claim 1, wherein the controller is configured to cause the device to operate in a first heating mode depending on the determined property of the susceptor arrangement.

8. The apparatus according to claim 1, wherein the controller is configured to determine a property of the susceptor arrangement based on the magnitude of the change in the electrical parameter of the circuit.

9. The apparatus according to claim 1, wherein the controller is configured to determine a property of the susceptor arrangement based on the sign of the change in the electrical parameter of the circuit.

10. The apparatus according to claim 1, wherein the property of the susceptor arrangement is whether or not the susceptor arrangement is present in the device, and the controller is configured to determine that the susceptor arrangement is present in the device based on whether a change in the electrical parameter is present.

11. The apparatus according to claim 1, further comprising a temperature measuring device wherein the controller is configured to receive a measured temperature of the susceptor arrangement from the temperature measuring device at a time when the circuit is changed between the loaded state and the unloaded state and use the measured temperature of the susceptor arrangement in determining the property of the susceptor arrangement.

12. The apparatus according to claim 1, wherein the susceptor arrangement is arranged within a consumable product comprising the aerosol generating material to be heated and the controller is configured to determine a property of the consumable from the determined property of the susceptor arrangement.

13. The apparatus according to claim 12, wherein the property of the consumable comprises an indicator of whether the consumable is an approved consumable or not an approved consumable, and the controller is configured to determine whether or not the consumable is an approved consumable and activate the device for use if the consumable is an approved consumable and not activate the device for use if the consumable is not an approved consumable.

14. The apparatus according to claim 1, wherein the electrical parameter is the effective grouped resistance r of the inductive element and the susceptor arrangement, and wherein the apparatus further comprises a capacitive element and a switching arrangement for enabling a varying current to be generated from a DC voltage supply and flow through the inductive element; and the controller is configured to determine the effective resistance r from a frequency of the varying current being supplied to the inductive element, a DC current from the DC voltage supply, and a DC voltage of the DC voltage supply, and wherein the effective grouped resistance r of the inductive element and susceptor arrangement is determined by the controller according to the relationship:

$$r = \frac{I_s}{V_s}\frac{1}{(2\pi f_0 C)^2}$$

where $V_s$ is the DC voltage and $I_s$ is the DC current, C is a capacitance of the circuit, and $f_0$ is the frequency of the varying current being supplied to the inductive element.

15. An aerosol generating device comprising apparatus according to claim 1.

16. A method of determining a property of a susceptor arrangement for an aerosol generating device, wherein the susceptor arrangement is for heating an aerosol generating material, the method being performed by a controller of an aerosol generating device comprising the controller and a circuit comprising an inductive element for heating the susceptor, wherein the method comprises:

determining, by the controller, a change in an electrical parameter of the circuit when the circuit is changed between an unloaded state wherein the susceptor arrangement is not inductively coupled to the inductive element, and a loaded state wherein the susceptor arrangement is inductively coupled to the inductive element; and determining, by the controller, the property of the susceptor arrangement from the change in the electrical parameter of the circuit wherein the electrical parameter is one of a resonant frequency of the circuit and an effective grouped resistance r of the inductive element and the susceptor arrangement.

17. The method according to claim 16, wherein:

the circuit is changed from the unloaded state to the loaded state when the susceptor arrangement is received by the device, and the circuit is changed from the loaded state to the unloaded state when the susceptor arrangement is removed from being received by the device.

18. The method according to claim 16, wherein the change in the electrical parameter is determined by comparing: a value of the parameter measured when the circuit is in the loaded state to a value of the parameter measured when the circuit is in the unloaded state.

19. The method according to claim 16 wherein the change in the electrical parameter is determined by comparing a value of the parameter measured when the circuit is in the loaded state to a predetermined value of the parameter corresponding to the circuit in the unloaded state, wherein the predetermined value is accessed by the controller from a memory.

20. The method according to claim 16, wherein determining the property of the susceptor arrangement comprises comparing the determined change in the value of the electrical parameter to a list of at least one stored value, wherein the property of the susceptor arrangement is indicated by determining to which value in the list the determined change corresponds.

21. The method according to claim 16 comprising activating the device for use or not activating the device for use depending on the determined property of the susceptor arrangement.

22. The method according to claim 16 comprising causing the device to operate in a first heating mode depending on the determined property of the susceptor arrangement.

23. The method according to claim 16 comprising measuring a temperature of the susceptor arrangement at a time when the circuit is changed between the loaded state and the unloaded state and using the measured temperature of the susceptor arrangement in determining the property of the susceptor arrangement.

24. The method according to claim 16 wherein the magnitude of the change of the electrical parameter is used to determine the property of the susceptor arrangement.

25. The method according to claim 16 wherein the susceptor arrangement is in a consumable comprising aerosol generating material to be heated and the method comprises determining a property of the consumable from the property of the susceptor arrangement.

26. The method according to claim 25, wherein the property of the consumable comprises an indicator of whether the consumable is an approved consumable or not an approved consumable, and the method comprises determining whether or not the consumable is an approved consumable and activating the device for use if the consumable is an approved consumable and not activating the device for use if the consumable is not an approved consumable.

27. The method according to claim 16, wherein the electrical parameter is the effective grouped resistance r of the inductive element and the susceptor arrangement, wherein the apparatus further comprises a capacitive element and a switching arrangement for enabling an varying current to be generated from a DC voltage supply and flow through the inductive element; and the method comprises determining the effective grouped resistance r from a frequency of the varying current being supplied to the inductive element, a DC current from the DC voltage supply, and a DC voltage of the DC voltage supply, and wherein the effective grouped resistance r of the inductive element and the susceptor arrangement is determined by the controller according to the relationship:

$$r = \frac{I_s}{V_s}\frac{1}{(2\pi f_0 C)^2}$$

where $V_s$ is the DC voltage and $I_s$ is the DC current, C is a capacitance of the circuit, and $f_0$ is the frequency of the varying current being supplied to the inductive element.

28. A controller for an aerosol generating device, wherein the controller is configured to perform a method according to claim 16.

29. A non-transitory computer-readable medium having data stored therein representing a set of machine readable instructions which when executed by a controller in an aerosol generating device cause the controller to execute a method according to claim 16.

* * * * *